L. J. NELSON.
BAND IRON CONNECTOR.
APPLICATION FILED JAN. 22, 1916.

1,270,193.

Patented June 18, 1918.

L. J. Nelson, Inventor.

Witness:
A. W. Jamieson.

By David O. Barnell,
Attorney.

UNITED STATES PATENT OFFICE.

LEON J. NELSON, OF OMAHA, NEBRASKA.

BAND-IRON CONNECTOR.

1,270,193.　　　Specification of Letters Patent.　　Patented June 18, 1918.

Application filed January 22, 1916. Serial No. 73,668.

*To all whom it may concern:*

Be it known that I, LEON J. NELSON, a citizen of the United States, and a resident of Omaha, in the county of Douglas and State of Nebraska, have invented certain new and useful Improvements in Band-Iron Connectors, of which the following is a specification.

My invention relates to devices for connecting to each other the ends of metal strips or bands, and particularly to such devices when used for securing the ends of band-irons as employed for binding boxes, box-shooks, crates or bundles or bales of any material whereof the form of the bound object is substantially rectangular. It is the object of my invention to provide a fastening or connecting device of the character described, having means for connecting therewith one end of a metal band and adapted to engage one corner of the box or the like so that the band may be placed under tension, and having means for connection with the other end of the band so that said end may be secured to the connector to hold the band under tension around the object bound thereby. A further object of my invention is to provide a connector which will have no projecting corners or the like and which will lie flat and close to the sides of the articles on which it is used.

Figure 1:
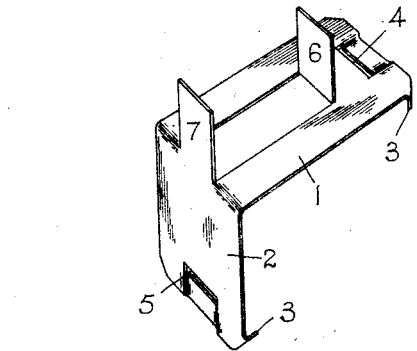
Figure 2:
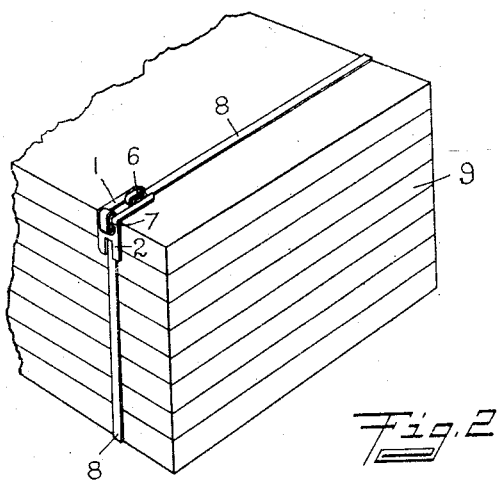
Figure 3:
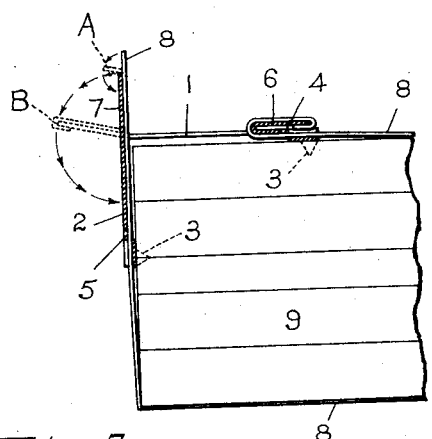
Figure 4:
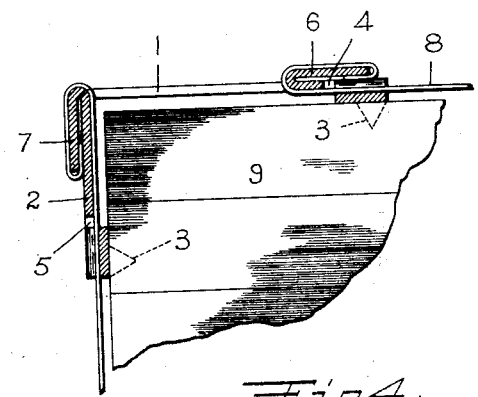
Figure 5:
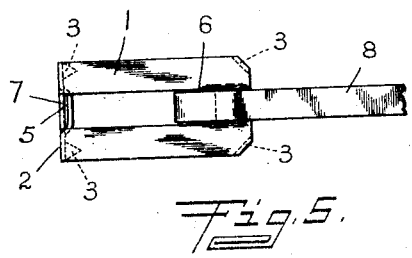

In the accompanying drawings, Figure 1 is a perspective view of the connector before the attachment of the band thereto, Fig. 2 is a perspective view of part of a box-shook held together by a band of which the ends are secured by the connector, Fig. 3 is a sectional view of the connector illustrating the method of attaching the free end of the band thereto, Fig. 4 is a similar view with the connection completed, and Fig. 5 is a plan view of the connector with the first end only of the band attached thereto.

The connector provided by my invention is formed from a rectangular strip of sheet metal which is bent along a transverse line near its center, to provide a body having portions 1 and 2 extending at right angles to each other and adapted to fit upon one corner of a box or other rectangular object. The corners of the strip or plate at the ends of the portions 1 and 2 are bent inwardly to provide teeth or prongs 3 adapted to slightly penetrate the material against which the connector is placed. Near the ends of the respective portions 1 and 2, transverse slots 4 and 5 are formed therein, and the material between the slots and said ends is swaged inwardly slightly more than the thickness of the metal, to provide longitudinally extending flat channels whose transverse width is equal to the length of the slots 4 and 5.

In the body-portion 1 there is a large longitudinal slot which extends from the corner at the end of the body-portion 2 to a point near the transverse slot 4, and the material removed from the plate in making said longitudinal slot is employed in forming two rectangular tongues 6 and 7, both of which extend upwardly at a right angle to the body-portion 1, the tongue 7 being also continuous with, or in a plane coincident with that of, the body-portion 2.

In the use of the connector a metal strip or piece of band-iron 8 is taken, of which the length is slightly more than enough to reach around the box, a box-shook 9, or other object to be bound or secured by the band. One end of the band 8 is first attached to the connector by passing said end down through the slot 4, thence up through the large central slot between the tongues 6 and 7, bending the end of the band over the upper end of the tongue 6, and then bending said tongue down flat onto the body-portion 1 and extending toward the end of the same away from the central slot, as shown clearly in Figs. 3 and 4. After the attachment to the connector of the one end of the band, the connector is placed upon one corner of the box-shook 9 or the like which is to be bound, and the band carried around the same so that the other end is returned to the connector. The latter end of the band is then passed in through the slot 5 and up back of the body-portion 2, through the large central slot and alongside the tongue 7. By pulling on the end of the band extending above the tongue 7, the loop of the band extending around the object 9 may be drawn tight, since the other end of the band is held by the engagement of the body-portion 2 of the connector with the corner of the object 9. After the band has tightened by suitable tension upon the free end thereof, it may be held tight by clamping together the lower part of the tongue 7 and the adjoining portion of the band, as by grasping said parts between the jaws of an ordinary pair of pliers. The unattached end of the band 8 is then secured to the connector by first bending said end of the band over the upper end of the tongue 7, as shown by the dotted lines A in Fig. 3, then bending said tongue outwardly and downwardly as indicated by the dotted lines B in the same figure, and finally flattening the tongue 7 down tight against the body-portion 2, as shown in Figs. 2 and 4. The usual consistency of the band-iron used for the purposes described, is such that after the bending of the tongue 7 to the position B represented in Fig. 3, it is unnecessary to continue clamping the tongue and band together with pliers or the like, so that the final operation of flattening down the tongue may be performed by merely pounding the tongue with a light hammer, or preferably with the same tool or instrument used at first for clamping the tongue and band together. The first operation of bending the end of the band to the position A can usually be done without any tool or instrument other than the fingers, and the bending of the tongue to the position B may be done by simply twisting upon the pliers or other instrument by which the tongue and band are clamped together. It will thus be seen that the attaching of the band to the connector may be very easily and quickly performed. After the connection is completed the band and connector are prevented from slipping longitudinally of the object 9 by the engagement of the prongs 3 therewith, and it will be seen also that there are no projecting sharp corners or the like which might catch upon the clothing or injure the hands of persons handling the bound articles.

In the foregoing description of the use of my connector it has been assumed that the band-iron is taken in pieces of suitable length for use on the articles to be bound, and when a large number of similar articles are to be bound, all the pieces of band-iron may have one end attached to the connectors therefor, being prepared in advance and before the beginning of the binding operations upon the lot of articles. The connectors may be used in a slightly different manner, however, and a certain waste of the band-iron avoided, as follows:

The band-iron is usually obtainable in long continuous strips, wound in coils or on spools, and in the use thereof the same may be taken directly from the spool or coil as needed in the binding operations. Where articles of miscellaneous and varying sizes are to be bound, the following method of procedure is particularly advantageous. The end of the band-iron 8 from the spool or coil is passed down through the large central opening of the connector and out through the slot 5, a suitable length of the band being pulled through said slot to form a loop large enough to pass easily around the article to be bound. The end of the band is then passed through the slot 4 and secured to the tongue 6, as before described, after which the loop is placed around the article to be bound, the connector engaged with the corner thereof, the band tightened and all slack removed from the loop by pulling upwardly on the portion of the band above the end of the tongue 7, and said tongue and the adjoining portion of the band then clamped together as before described. The band is then cut off so that a small portion thereof projects beyond the end of the tongue 7, as shown in Fig. 3, after which said projecting end-portion is turned back around the end of the tongue and the connection completed as at first described.

It may be noted that the operation of securing the last end of the band to the connector is such that there is no tendency to slacken or reduce the tension of the loop or portion of the band extending around the bound object, but rather to increase the tension of the band, due to the drawing of the same around the upper edge of the body-portion 2 and the attached end of the tongue 7. It may be noted further that by the last described method of using the connector all waste of the band-iron is avoided, since no more of the same is used than actually necessary to pass around the bound article and form the attachments to the connector.

Now, having described my invention, what I claim and desire to secure by Letters Patent is:

1. A band-iron connector comprising a metal plate having body-portions extending angularly to each other, said portions having near their remote ends transverse slots therein, there being a central longitudinal slot in the one body-portion, and tongues at the ends of said slot, one of said tongues being continuous with the other body-portion.

2. A band-iron connector comprising a metal body having portions extending angularly to each other and adapted to fit around the corner of a rectangular object, means for securing the end of a metal band to one of said body-portions, the other body-portion being perforate to receive slidably a part of said metal band, and a member continuous with the latter body-portion and adapted to be clamped to said part of the metal band while the latter is held under tension and to be bent together with said part of the band to secure the same thereto while said elements are clamped together.

3. The combination with a flexible metal band, of a connector for the ends thereof, comprising a body having angularly disposed portions adapted to fit around the corner of a rectangular object, one portion of said body having a central slot extending to the corner at the end of the other portion, means for securing one end of the metal band to said slotted body-portion, means adapting the other body-portion to receive slidably a part of the metal band extending past the same and through the slot in the first portion, and a flexible tongue adapted to be bent together with said part of the metal band to secure the same together and simultaneously tighten the portion of the metal band extending to the first attached end thereof.

4. A band-iron connector comprising a metal plate having a central longitudinal slot and tongues integral with the plate extending laterally from the ends of said slot, said tongues adapted to be bent away from the slot onto the adjacent faces of the plate to secure thereto the ends of band-iron extending through the slot and around the ends of said tongues.

5. A band-iron connector comprising an integral metal plate having a vertical portion and a horizontal portion joining the upper end of the vertical portion, the horizontal portion having means for securing thereto the end of a piece of band-iron and having a central slot adjoining the end of the vertical portion, a tongue coextensive laterally with said slot and extending continuously from the vertical portion above the plane of the horizontal portion, and the vertical portion having guiding means adapted to receive slidably a strip of band-iron extending alongside the same and said tongue and through said slot, whereby the strip may be tightened, clamped to said tongue and secured thereto by bending the same and the tongue simultaneously and while the strip is under tension.

6. A band-iron connector comprising an integral metal plate having a central longitudinal slot and two tongues coextensive laterally with said slot and projecting from the plate at the ends of said slot, there being a slot near each end of the plate alined longitudinally with the central slot, and portions of the plate between the latter slots and the ends of the plate being offset from the plane of the adjacent portions of the plate.

LEON J. NELSON.

Copies of this patent may be obtained for five cents each, by addressing the "Commissioner of Patents, Washington, D. C."